(12) United States Patent
Torrey et al.

(10) Patent No.: US 11,677,289 B2
(45) Date of Patent: Jun. 13, 2023

(54) ELECTRIC POWER SYSTEM FOR HYPERSONIC SPEED OPERATION

(71) Applicant: General Electric Company, Schenectady, NY (US)

(72) Inventors: David Allan Torrey, Ballston Spa, NY (US); Anil R. Duggal, Niskayuna, NY (US); Bugra Han Ertas, Niskayuna, NY (US); William D. Gerstler, Niskayuna, NY (US); Jie Jerry Liu, Niskayuna, NY (US); Weijun Yin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 16/597,633

(22) Filed: Oct. 9, 2019

(65) Prior Publication Data
US 2021/0013759 A1  Jan. 14, 2021

Related U.S. Application Data

(60) Provisional application No. 62/872,827, filed on Jul. 11, 2019.

(51) Int. Cl.
*H02K 3/30* (2006.01)
*H02K 15/04* (2006.01)
(Continued)

(52) U.S. Cl.
CPC .......... *H02K 3/30* (2013.01); *H02K 3/02* (2013.01); *H02K 7/003* (2013.01); *H02K 7/08* (2013.01);
(Continued)

(58) Field of Classification Search
CPC ............ H02K 3/30; H02K 15/04; H02K 3/02; H02K 7/00; H02K 7/08; H02K 9/19;
(Continued)

(56) References Cited

U.S. PATENT DOCUMENTS 5,209,646 A * 5/1993 Smither ................ H02K 44/04
310/11
5,936,373 A   8/1999 Li et al.
(Continued)

FOREIGN PATENT DOCUMENTS

CN      109716624 A  *  5/2019  ............. B63H 21/17

OTHER PUBLICATIONS

CN-109716624-A machine translation Feb. 24, 2022.*
(Continued)

*Primary Examiner* — Leda T Pham
(74) *Attorney, Agent, or Firm* — Dority & Manning, P.A.

(57) ABSTRACT

A powered system that has an electric power system with a stator having plural poles with each pole having a conductive winding that may surround the corresponding pole and may be configured to generate a magnetic field, and a rotor that may be configured to rotate in response to the magnetic field generated by the stator. The at least one of the conductive windings may be insulated with an insulation material configured to conduct heat from the at least one conductive winding while operating at a temperature above 600° C.

19 Claims, 9 Drawing Sheets

(51) Int. Cl.
   *H02K 7/00*     (2006.01)
   *H02K 7/08*     (2006.01)
   *H02K 3/02*     (2006.01)
   *H02K 9/22*     (2006.01)
   *H02K 9/20*     (2006.01)

(52) U.S. Cl.
   CPC ............... *H02K 9/20* (2013.01); *H02K 9/227* (2021.01); *H02K 15/04* (2013.01)

(58) Field of Classification Search
   CPC ............ H02K 9/22; H02K 3/325; H02K 3/18; H02K 7/003; H02K 5/1672; F16C 33/107
   See application file for complete search history.

(56) References Cited

U.S. PATENT DOCUMENTS

| | | | |
|---|---|---|---|
| 6,590,305 B2 | 7/2003 | Wang et al. | |
| 6,680,667 B2 | 1/2004 | Razzell et al. | |
| 7,230,361 B2 | 6/2007 | Hirzel | |
| 7,969,049 B2 | 6/2011 | Laskaris et al. | |
| 8,030,818 B2* | 10/2011 | Nelson | H02K 3/24 |
| | | | 310/208 |
| 8,720,205 B2 | 5/2014 | Lugg | |
| 9,127,713 B1 | 9/2015 | Lu | |
| 9,410,572 B2* | 8/2016 | Shoup | F16C 33/02 |
| 9,843,233 B2* | 12/2017 | Nabeshima | H01F 27/28 |
| 10,910,897 B2 | 2/2021 | Mashkin et al. | |
| 2005/0249440 A1* | 11/2005 | Yokoo | F16C 17/107 |
| | | | 384/100 |
| 2012/0269660 A1* | 10/2012 | Yin | H02K 5/132 |
| | | | 310/87 |
| 2016/0102631 A1* | 4/2016 | Lynn | F02C 1/10 |
| | | | 60/517 |
| 2018/0233981 A1* | 8/2018 | Yin | H02K 15/12 |
| 2018/0301244 A1 | 10/2018 | Calebrese et al. | |
| 2020/0161917 A1* | 5/2020 | E Silva | H02K 3/48 |

OTHER PUBLICATIONS

Fang et al., "Insulation Performance Evaluation of High Temperature Wire Candidates for Aerospace Electrical Machine Winding Application", 2013 Electrical Insulation Conference, Ottawa, Ontario, Canada, Jun. 2 to 5, 2013.

Radil et al., "Thermal Management Techniques for Oil-Free Turbomachinery Systems" NASA/TM—2006-214358, ARL-TR-3799, Oct. 2006.

* cited by examiner

ELECTRIC POWER SYSTEM FOR HYPERSONIC SPEED OPERATION

CROSS REFERENCE

This application claims priority to U.S. Provisional Patent Application No. 62/872,827, entitled ELECTRIC POWER SYSTEM FOR HYPERSONIC SPEED OPERATION, which was filed on 11 Jul. 2019, and the entire disclosure of which is incorporated herein by reference.

FIELD

The subject matter described herein relates to an electric power system that operates at hypersonic speeds.

BACKGROUND

Electric power systems, or electric machines, generate power by using electric properties and magnetic forces. In particular, a typical electric power system includes a stator and a rotor. The stator includes magnetic material, conductive windings coupled to a magnetic circuit, or the like, to generate a magnetic field when rotating the rotor. The rotor similarly may include electromagnetic materials that include poles, permanent magnets secured to the rotor, or the like that cause rotation of the rotor based on the magnetic field or fields formed by the stator. The rotor may then be coupled to a shaft, armature, or the like that performs work as desired by a user. The shaft includes bearing surfaces that are lubricated to reduce wear. Meanwhile, inefficiencies of the stator and rotor in converting the magnetic energy to mechanical energy are dispelled from the electric machine in the form of heat into the ambient environment.

For electric power systems used in aviation applications that require operation at hypersonic speeds, high power density motors and generators are needed that can operate at temperatures of up to and greater than 600° C. Consequently, these electric machines may need to efficiently supply high voltage functionality with materials and systems that do not degrade or lose significant efficiency as a result of the elevated temperatures.

As an example, electric machine power density can be limited by the ability to remove heat generated from machine losses or other inefficiencies. Sources of losses include Joule heating of the conductor material associated with AC (alternating current) and DC (direct current), losses associated with eddy currents and hysteresis in the structures through which the electromagnetic field passes, and mechanical losses associated with friction between moving parts and fluids. A 100 kW electric machine that is considered to be approximately 85-90% efficient may manage 10-15 kW of heat. To manage the heat, the heat may need to be moved away from the electric machine. If the heat is not removed, the machine temperature increases thus increasing the conductor and structure temperature, thereby creating more losses and higher temperatures, all of which eventually leads to a thermal run-away and machine failure. Typically, the heat is moved to the surrounding environment. However, when the electric machine is operating at an environment that is already at 600° C., traditional methods of heat conveyance is not sufficient for efficient operation.

As another example, electric machines often use permanent magnets secured to the rotor, or permanent magnet materials to generate the magnetic fields that create forces that rotate the rotor. Energy density of permanent magnets at high temperature greatly diminishes, however, thereby resulting in diminished performance.

As yet another example, bearing systems in electric machines often use lubricating oil to reduce wear on the bearing surfaces. Not only are there material constraints for lubricants when operating at temperatures in excess of 600° C., additional design constraints are presented in the utilization of a lubrication subsystem that supplies lubricating oil to bearings in the confined aviation setting.

BRIEF DESCRIPTION

In one or more embodiments, a powered system may be provided that includes an electric power system. The electric power system may include a stator having plural poles with each pole having a conductive winding that surrounds the corresponding pole and configured to generate a magnetic field, and a rotor configured to rotate in response to the magnetic field generated by the stator. At least one of the conductive windings may be insulated with an insulation material configured to conduct heat from the at least one conductive winding while operating at a temperature above 600° C.

In one or more embodiments, a powered system may be provided that includes an electric power system with a stator having plural poles with each pole having a conductive winding that surrounds the corresponding pole and configured to generate a magnetic field. The conductive winding may be encased within a first cavity of an insulation body. The electric power system may also include a rotor configured to rotate in response to the magnetic field generated by the stator. The insulation body may be fluidly connected to a cooling system to receive liquid metal from the cooling system and convey the liquid metal to the cooling system after the liquid metal conducts at least some heat from at least one of the conductive windings.

In one or more embodiments, a method of forming an electric machine for a powered system is provided that includes forming a conductive winding encased by an insulative body with a three-dimensional printing device. A stator may be magnetically coupled to a rotor by wrapping the conductive winding around a pole of the stator and providing current to the conductive winding to induce current in the rotor.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The embodiments described herein provide electric power systems for a power system that operates at hypersonic speeds. The electric power system includes a switched reluctance electric motor that may not utilize permanent magnets or permanent magnet materials. Instead, the stator and rotor include salient poles that interact to rotate the rotor, and the salient poles of the stator are wound with insulated conductive windings. Specifically, insulation material surrounds the conductive winding to provide electrical insulation, to prevent stray currents, and to convey heat from the conductive windings. The insulation material optionally may also include a flow cavity or channel to provide a fluid flow path for a fluid to conduct heat from the conductive element of a conductive winding and to convey the heat for use in association with other systems of the powered system. In this manner, the electric power system can also include an integrated thermal management system that conveys heat from the electric power system to decrease thermal fatigue of components of the electric power system while enhancing efficiencies. The electric power system also may include a bearing system for the shaft rotated by the rotor that includes a gas bearing system. By utilizing readily available high pressure gas as a bearing lubricant, the need for lubricating oil, and an accompanying lubricating oil system may be reduced or eliminated. As a result of these combined systems, an improved electric power system is provided that is efficient, resistant to wear, and able to operate in elevated temperatures (e.g., temperatures exceeding 600° C.).

Figure 1:
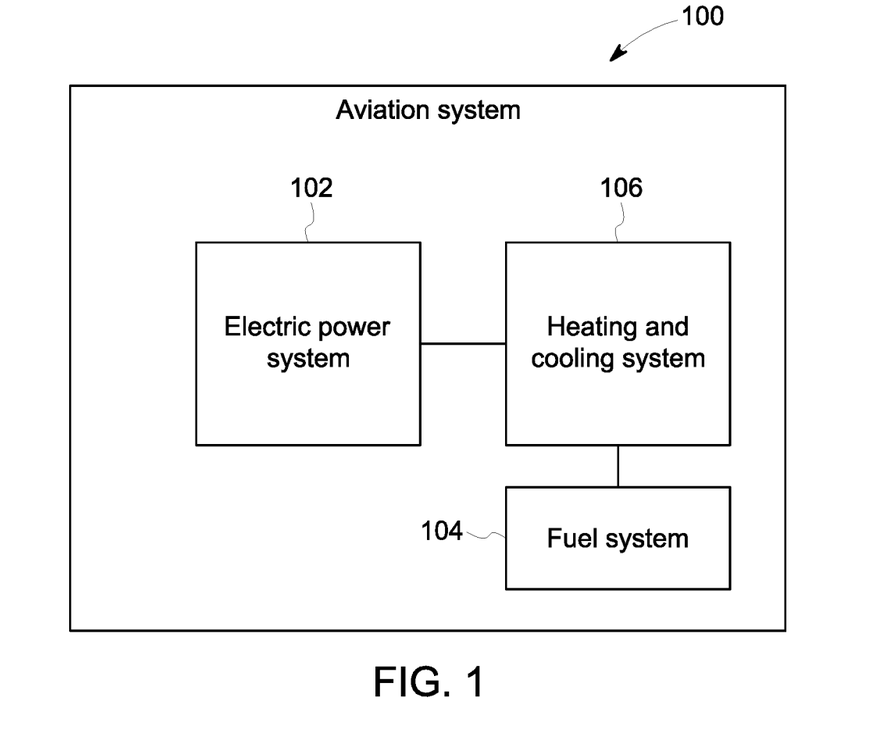
FIG. 1 is a schematic illustration of an powered system according to an embodiment.

FIG. 1 illustrates a schematic illustration of a powered system 100. The powered system 100 may be an aviation system, such as a jet, fighter aircraft, or other aircraft that may achieve hypersonic speeds. In one example, hypersonic speed is five times the speed of sound (Mach 5) or greater.

The powered system 100 includes an electric power system 102 that is an electric power machine that powers a drive shaft 114, a fuel system 104 that supplies fuel to an engine (not shown), and a cooling system 106 that conveys heat from the electric power system, including introducing the heat into fuel of the fuel system 104. In one example, the engine is a turbo jet engine of an aircraft. While the powered system 100 also includes other systems such has steering systems, communications systems, or the like, they are not described herein.

Figure 2:
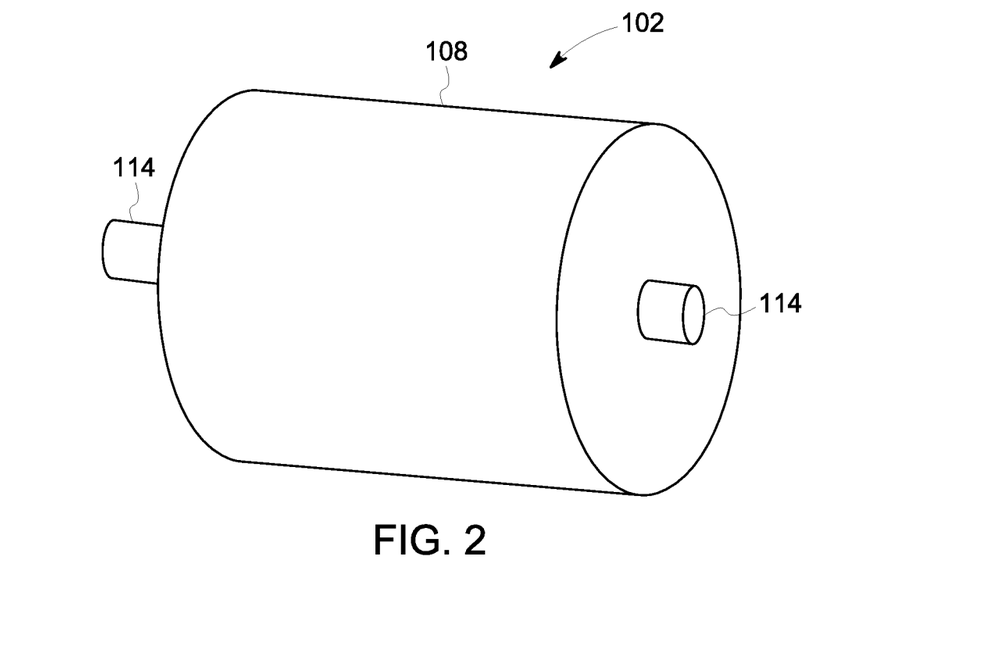
FIG. 2 is a front perspective view of an electric machine of an powered system according to an embodiment.
Figure 3:
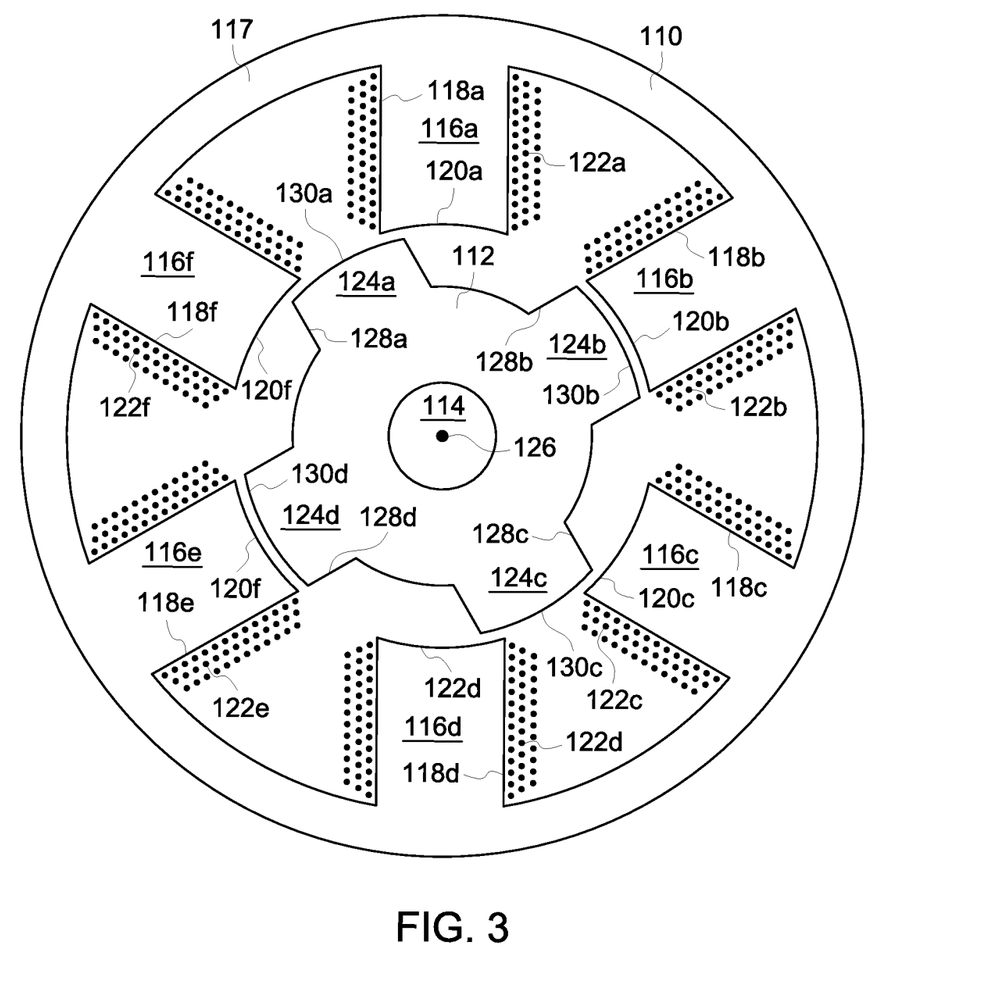
FIG. 3 is a rotor and stator of an electric machine according to an embodiment.

FIGS. 2 and 3 illustrate the electric power system 102 that may be considered an electric power machine. The electric power system 102 includes a housing 108 that houses a stator 110 and rotor 112 that may be coupled to a drive shaft 114. The rotor 112 may be within the stator 110; however, in other example embodiments the stator 110 may be within the rotor 112. Specifically, the rotor 112 can be concentrically disposed relative to the stator 110. In one embodiment, the rotor 112 does not use or have permanent magnets to cause rotation of the rotor 112. In particular, at elevated temperatures, including above 600° C., a significant impact on energy density of permanent magnets occurs. This impact results in substantially diminished remnant field, making the use of permanent magnets impractical and therefore undesirable.

As illustrated in FIG. 3, in one example, the stator 110 and rotor 112 arrangement is that of a switched reluctance electric motor. Specifically, the stator 110 includes plural poles 116*a-f* of corresponding electromagnets that are generally salient poles that in one example extend from a stator yoke 117. In this example, six poles 116*a-f* are spaced apart from one another around a perimeter of the stator 110, and extend inwardly toward the rotor 112. Each pole 116*a-f* may include a sidewall 118*a-f* and terminates in an arcuate end 120*a-f* to allow rotation of the rotor 112 that is centrally located within the stator 110. The stator poles and yoke may be stamped from 35A360 non-oriented electrical sheet steel that may include cobalt steels such as hiperco or other similar steels that have greater saturation flux density than silicon steels. Each pole 116*a-f* has at least one corresponding conductive winding 122*a-f* that wraps around, and at least partially surrounds each sidewall 118*a-f*. In one example, each conductive winding 122*a-f* is insulated. Specifically, each conductive winding may comprise a ceramic-based insulating material that at least partially surrounds a conducting material that in one example is metallic. Alternatively, in another embodiment, a ceramic-based insulating material is positioned adjacent each conductive winding 122*a-f*, including, in one example, in the triangular area or space between stator poles 116*a-f*, exterior to the rotor 112.

Figure 5:
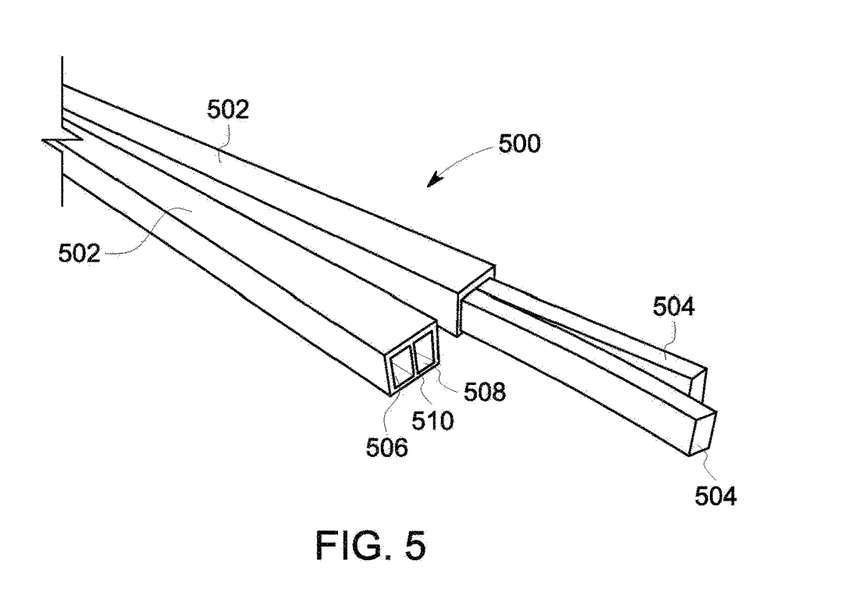
FIG. 5 illustrates a front perspective view of insulated conductive windings of an electric machine according to an embodiment.
Figure 6:
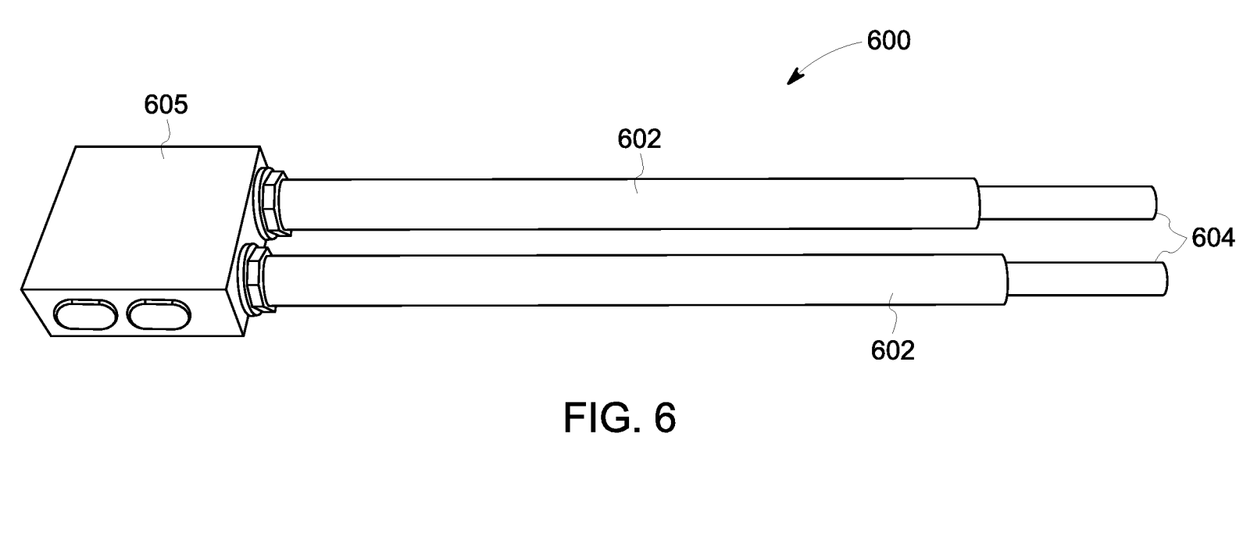
FIG. 6 illustrates a front perspective view of insulated conductive windings of an electric machine according to an embodiment.

In one example, each conductive winding is manufactured in a method as described in relation to the conductive windings illustrated in FIGS. 5 and 6. In one such example, the ceramic-based material is alumina and the conducting material is one of copper, silver, nickel, nickel plated copper, or silver plated copper, or the like. Alternatively, the ceramic-based material may be zirconia, zirconium dioxide, magnesium oxide, macor composite, mullite, mica glass, or the like. In each instance, the ceramic-based material has a melting point significantly above both 600° C. and the conductive material, to allow the ceramic-based material to conduct heat from the conductive material and convey the heat away from the conductive material. Alternately, the conductive material also may be a ceramic material that includes conductive properties that cause the conductive material to produce a magnetic field in relation to the rotor 112 as required for actuation of the rotor at a needed speed.

The rotor 112 is centrally disposed within the stator 110 and coupled to the drive shaft 114. The rotor 112, similar to the stator 110, includes poles 124*a-d* of corresponding electromagnets each extending from a central axis 126; however, does not include permanent magnets or permanent magnet material. Each pole 124*a-d* is generally a salient pole similar to the stator 110. In the example as illustrated in FIG. 3, each pole 124*a-d* includes a sidewall 128*a-d* and terminates in an arcuate end 130*a-d* that arcs opposite of the arcuate ends 120*a-f* of the stator poles 116*a-f* such that the outside surfaces of each terminating end complement one another. Like the stator, the rotor poles and yoke are typically stamped from 35A360 non-oriented electrical sheet steel that may include cobalt steels such as hiperco or other similar steels that typically have greater saturation flux density than silicon steels.

In one example embodiment, as illustrated in FIG. 3, the stator 110 rotor 112 set includes six stator poles and four rotor poles, and is considered a 6/4 switched reluctance machine. In this example, the conductive windings 122a-f on diametrically-opposed teeth may be electrically connected in series or parallel to form phase windings. Such a 6/4 switched reluctance machine has three phases that are excited through a switching inverter. Torque is produced by the attraction of the nearest rotor poles to the excited stator poles. The switch reluctance machine may be considered a synchronous motor because the excitation of the conductive windings 122a-f is synchronized to rotor position. At low speeds the phase currents may be regulated to control torque. At high speed, the phase currents may become self-regulating and an inverter only needs to provide commutation, not current regulation. In one example, an increase phase order may reduce the impact of a faulted phase, or reduce torque ripple.

Figure 4:
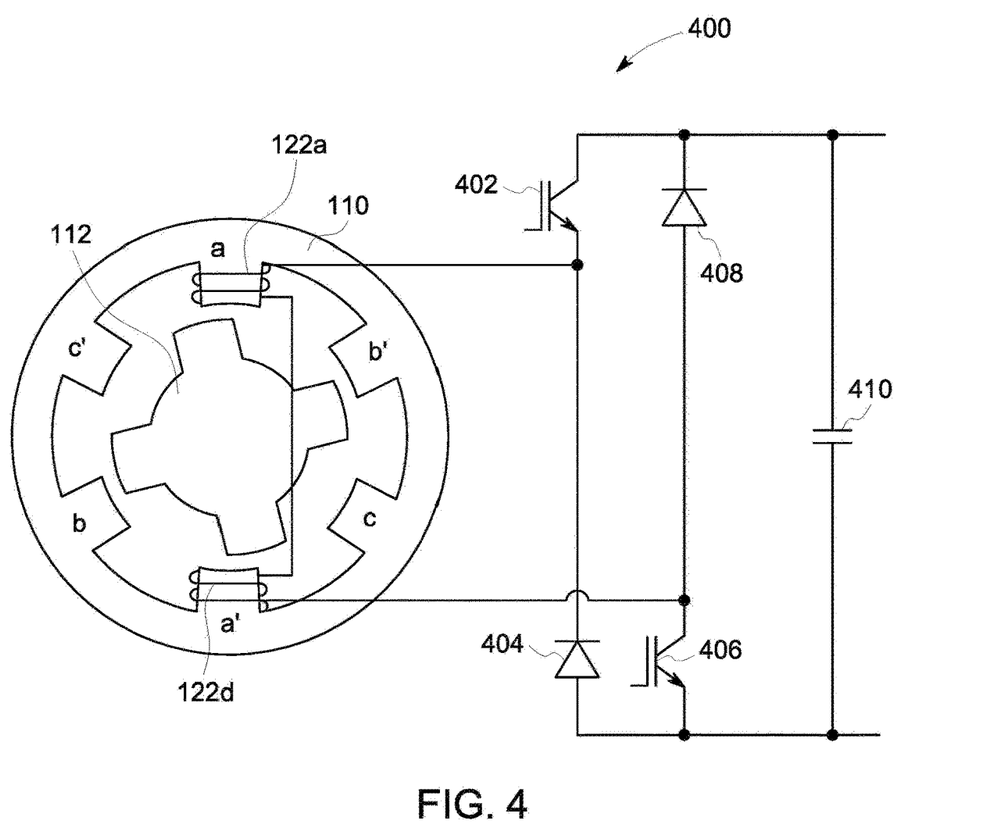
FIG. 4 is a schematic diagram of a magnetic circuit of an electric machine according to an embodiment.

FIG. 4 illustrates a schematic circuit diagram of an example inverter circuit 400 for supplying excitation current to the conductive winding 122a-f. In this example, the inverter circuit 400 includes a first switch 402 and first diode 404 arranged in parallel to a second switch 406 and second diode 408. A first conductive winding 122a is coupled between the first switch 402 and first diode 404, and a fourth conductive winding 122d opposite the first conductive winding 122a is coupled between the second switch 406 and second diode 408. A capacitor 410 is also electrically coupled in parallel to both the first switch 402 and first diode 404, and the second switch 406 and second diode 408. In this manner, the inverter circuit 400 illustrated uses two controllable switches and two diodes per phase. The inverter circuit 400 supplies time-varying, but unipolar current to the phase winding, because torque production in the switched reluctance machine is independent of current direction. While FIG. 4 illustrates an example inverter circuit topology, other inverter circuit topologies may be used for the switched reluctance machine illustrated in FIG. 3. These alternative topologies may reduce the number of controllable switches, impose operational limitations, or the like.

FIGS. 5 and 6 illustrate example conductive windings 500 and 600 that may be used as conductive windings 122a-f as described in relation to FIGS. 2-3. FIG. 5 illustrates an example conductive winding 500 that includes an insulation body 502, and a conductive element 504 that has been inserted into the insulation body 502. The conductive element 504 may extend from the insulation body 502. The reason the conductive element 504 is extending from the insulation body is for illustrative purposes in relation to this disclosure. In particular, the conductive winding 500 when wrapped around a stator as illustrated in FIG. 3 may have a conductive element 504 that is encased in the insulation body 502, such that the conductive element 504 is not exposed to the environment. Alternatively, the conductive element 504 may only be partially encased in the insulation body 502, such that a portion of the conductive element is exposed to the environment.

In addition to the winding 500, in FIG. 5, an insulation body 502 that does not include a conductive element 504 is illustrated for the purposes of description of the interior of the insulation body 502 for the illustrated example embodiment. As illustrated, the insulation body 502 includes first cavity 506 and second cavity 508 that are in side-by-side relation and separated by a dividing wall 510. In the example of FIG. 5, the winding 500 illustrated includes a conductive element 504 that has been inserted into each cavity. In alternative embodiments, only a single cavity is provided. In yet other embodiments, only the first cavity 506 receives the conductive element 504, and the second cavity provides a fluid flow path for a fluid that conducts heat from the conductive element 504 and conveys the heat to a cooling system.

As described in relation to FIGS. 2-3, the windings 500 and 600 of FIGS. 5 and 6 illustrate the insulation body 502 that comprises a ceramic-based insulating material. In one embodiment, the ceramic-based material is alumina. Alternatively, the ceramic-based material may also be zirconium, macor composite, mica glass, mullite, alumina, zirconia, zirconium dioxide, magnesium oxide, or the like. In each instance, the ceramic-based material has a melting point significantly above both 600° C. and the conductive material of the conductive element to allow the ceramic-based material to conduct heat from the conductive material and convey the heat away from the conductive material.

The insulation body 502 may be formed using numerous manufacturing methods. As examples, the insulation body 502 may be a pre-made insulative conduit or tube, and the conductive element 504 is manufactured to be of size and shape to be inserted into the conduit. In another example, the insulation body 502 is molded. In yet other example embodiments, the winding 500 is made from an additive process, including through 3-D based printing such that the insulation body 502 and conductive element 504 are formed in the same process.

In addition, the process for manufacturing the winding may be provided such that the difference in coefficient of thermal expansion (CTE) between the insulation body material and the conductive element 504 does not lead to ceramic fracture upon temperature cycling. For instance, the CTE for alumina and Cu is $8.4 \times 10^{-6}/°$ C. and $17 \times 10^{-6}/°$ C., respectively. Thermo-mechanical analysis and experiments show that the desired thermo-mechanical stability can be achieved. In testing coupons of alumina, tubes having a Cu core are able to pass 1000 cycles under a cycling condition of −78° C. to 250° C., in contrast to less than 10 cycles with an alternative manufacturing process.

The conductive element 504, similar to the insulation body 502, may be formed from any manufacturing process. In one example the conducive element is pre-made of size and shape to be inserted into an insulation body 502. Alternatively, a metallic powder is placed into at least one cavity of the insulation body 502, and the insulation body 502 is then exposed to high temperatures to cause the powder to liquefy. Because of the thermal properties of the insulation body 502 have a significantly higher melting point than the conductive material, and in particular the metallic power, the metallic powder may liquefy and then cool to form the conductive element. In yet another example, the conductive element 504 is made using an additive process, including 3-D printing applications as described in relation to forming the insulation body 502. By using these additive techniques, complex geometries may be formed, including complex geometries associated with end windings (FIG. 6) that may not be formed using subtraction based manufacturing techniques. In this manner, the windings may be made of size and shape to accommodate a hypersonic aviation system environment. Alternatively, the conductive material can be deposited onto the insulation body 502 chemically, such as by plating.

FIG. 6 illustrates another example of conductive windings 600. In this example the insulation body 602 again receives a conductive element 604 where the conductive element 604 is extending from the insulation body 602. In this example, an end-winding section 605 is illustrated that houses end windings. As described above, the end-winding section 605 may be manufactured using an additive process such as 3-D printing to accommodate the complex geometries of an end-winding. The additive process also allows the end-winding to maintain a size and shape that may be used in the confined space of a hypersonic aviation system.

Figure 7:
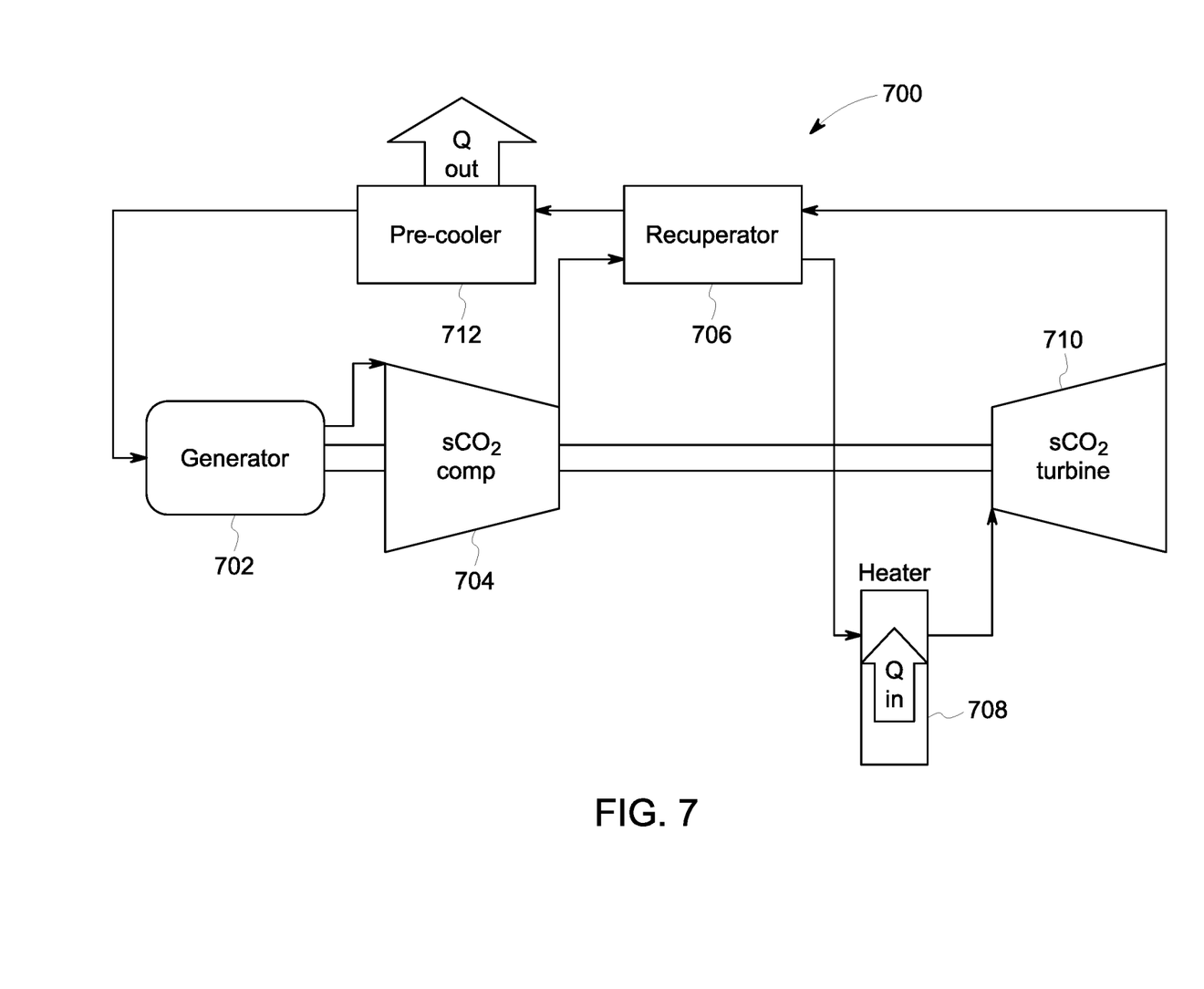
FIG. 7 is a schematic diagram of an electric power system using an electric machine according to an embodiment.

FIG. 7 is a schematic diagram of an example power generation system 700 using an electric machine according to an embodiment. In this example, the power generation process fluid is used to cool the electric machine (herein generator 702) in a hypersonic aviation system. In one such example, the heat, or Q out is conveyed to the fuel system (not shown) to heat the fuel before combustion. Alternatively, the heat generated may be conveyed to other systems, or alternatively into the ambient air.

In the example of FIG. 7, the power generation system 700 receives heat from an external source 706. In examples, the external source 706 may include high velocity ram air or heat from a vehicle engine. The process fluid (such as supercritical carbon dioxide—sCO2) is heated and then expanded through a turbine. This produces rotational shaft power that turns a compressor 704, and the generator 702, that are mechanically coupled to the turbine.

A recuperator heat exchanger 708 may be used to increase system efficiency, after which heat is rejected from the process fluid in the pre-cooler heat exchanger 712. In one example, the heat (Qout) is conveyed to fuel of a fuel system. In another example the pre-cooler functions as a heat sink that dispels the heat into the ambient environment. The coldest process fluid is then available for the generator 702 for removing heat, and lubrication. In this example, the generator 702 is an electric machine as described in relation to FIGS. 2-3 above. In particular, in one embodiment, an insulation body is provided as described in relation to FIGS. 5-6, where a fluid is presented within a cavity or channel of the insulation body to convey heat generated by conductive elements. In other examples, cavities or channels may be formed in the triangular area located between windings between stator poles such that the cavities or channels do not interfere with the operation of the rotor, but are able to conduct heat from within the system through a fluid medium. In particular, in one example, an alumina matrix may be provided such that the thermal resistance between the conductor element of the winding, and the alumina matrix is minimal. In either instance, heat is conducted by a fluid within the generator 702 for use and/or management by the electric power system 700. In particular, the fluid is able to operate above the 600° C. temperature. In examples, the fluid may be a supercritical fluid such as a supercritical carbon dioxide (sCO2).

Figure 8:
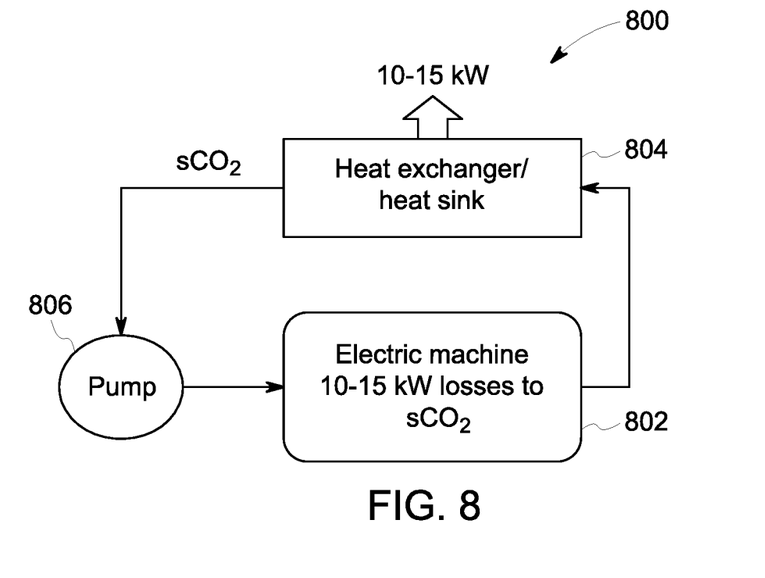
FIG. 8 is a schematic diagram of a cooling system using an electric machine according to an embodiment.
Figure 9:
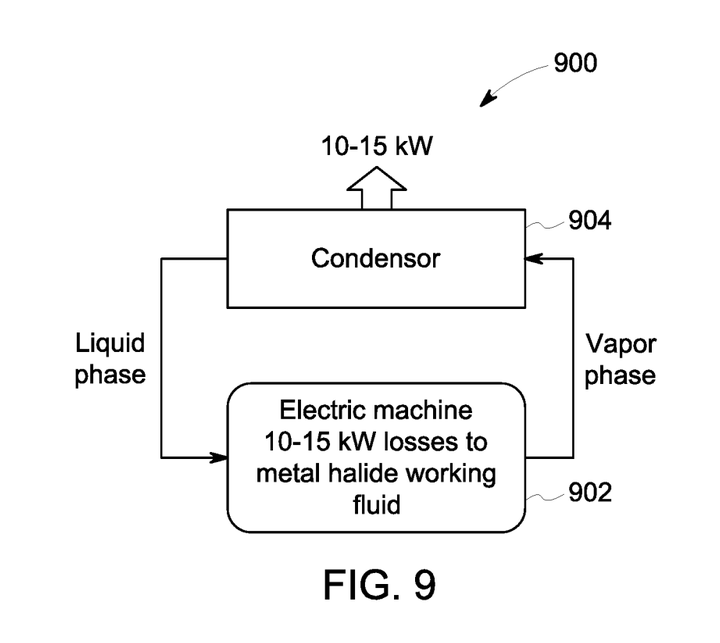
FIG. 9 is a schematic diagram of a cooling system for an electric machine according to an embodiment.

FIGS. 8 and 9 illustrate cooling systems to remove heat from electric machines. In FIG. 8, a cooling system 800 is provided that conveys a fluid through the electric machine 802 and conveys the fluid to a heat exchanger or a heat sink 804. Again, in an embodiment when a heat exchanger is provided, the heat from the fluid may be used or dispelled into another system such as a fuel system. Whereas, in example embodiments, when a heat sink is provided, the excess heat may be dispelled into the ambient air. Then a pump 806 may be used to convey the cooled fluid back the electric machine 802.

In the example embodiment of FIG. 9, another simplified cooling system 900 is provided. In this cooling system 900, the electric machine 902 expels a fluid that is in a vapor form and conveys the fluid to a condenser 904 that extracts the heat from the vapor for use or expelling. The condenser 904 then condenses the fluid back into a fluid form for use again by the electric machine 902. In one example, the fluid may be a liquid metal. In another example, a metal halide working fluid is used within this cooling system 900, and conveyed through a loop heat pipe, or thermosiphon, where capillary forces in an evaporator provide the driving force to circulate the fluid. Regarding the liquid metals, at 600° C. the alkali metals may have vapor pressures that range including and between 0.004 bar and 0.4 bar, resulting in the use of two-phase thermal devices such as heat pipes and/or thermosyphons to operate above 600° C.

In one example, heat is conveyed into the surrounding environment that may be at 600° C. However, when the surrounding environment is not capable of absorbing all, or a portion the electric machine heat, in addition to having a coolant operating above 600° C., an alternative heat sink, such as the fuel, or other similar system may be used. By using fuel, the heat sink is not only expendable, the heat also produces thrust to improve operational efficiencies. In examples where fuel is used as a heat sink, directly cooling the electric machine with fuel may be provided to provide additional functionality and efficiencies.

Figure 10:
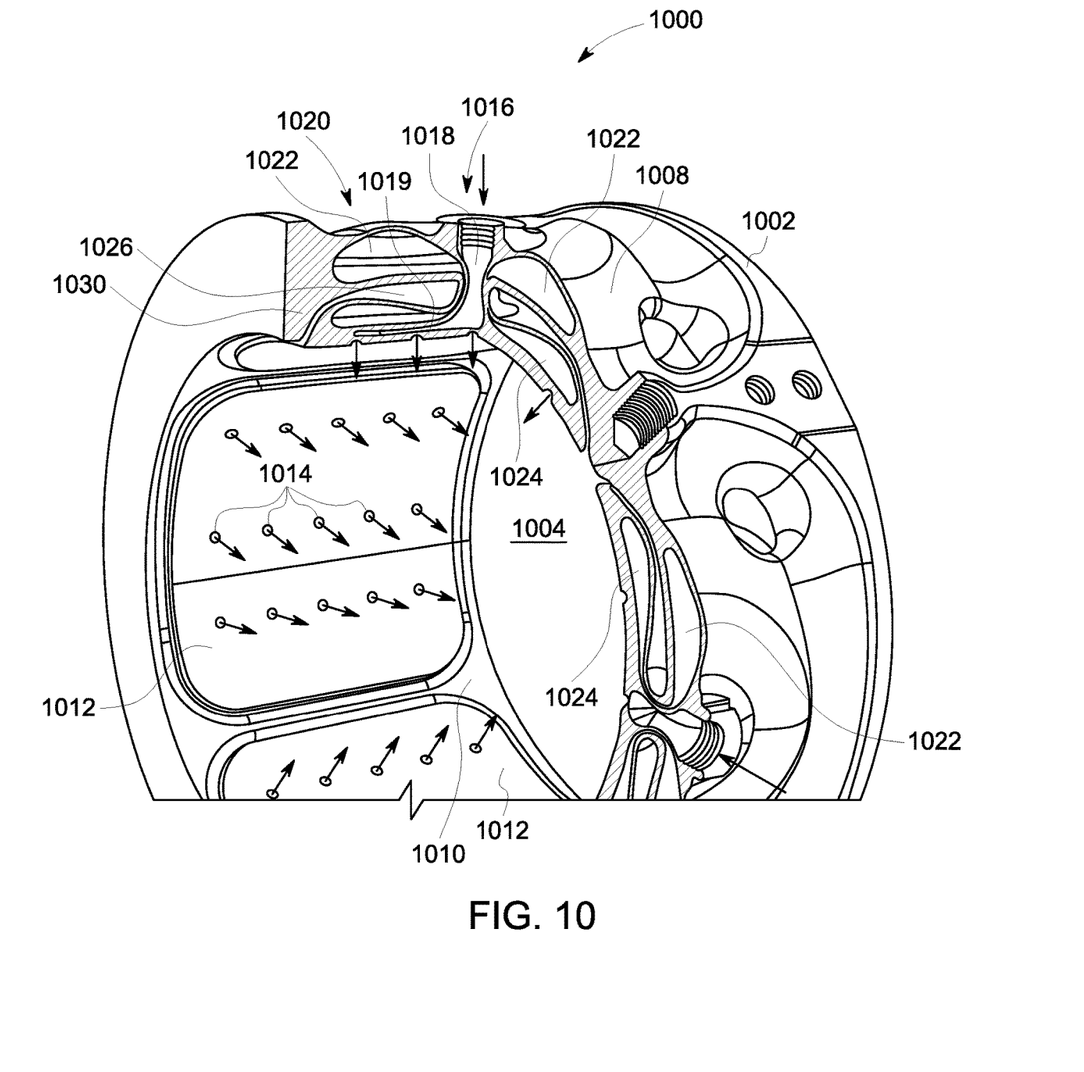
FIG. 10 is a front cut-away perspective view of a bearing system for an electric machine according to an embodiment.

FIG. 10 is a front cut-away perspective view of a bearing system 1000 for an electric machine according to an embodiment. The bearing system 1000 may represent any bearing used in an electric power system of an aviation system, including bearing systems used in relation to the drive shaft 114 of the electric power system 102 illustrated in FIGS. 1-4. Specifically, in one example the electric power system 102 includes two bearing systems, one located adjacent the first end of the drive shaft, and a second located adjacent the opposite second end of the drive shaft.

The bearing system 1000 includes a bearing housing 1002 that is generally circular in shape and having a centrally located opening 1004 through which a drive shaft 1006 (FIG. 11) is disposed therethrough. While the bearing housing 1002 is generally illustrated as circular, the bearing housing 1002 may include other shapes depending upon space and support requirements. Still, the opening 1004 remains generally circular to support the drive shaft 1006. Specifically, the bearing housing 1002 is static, and does not move in relation to the rotating drive shaft 1006 that rotates relative to the bearing housing 1002.

The bearing housing includes an exterior surface 1008 and an interior surface 1010 that forms a perimeter about the opening 1004. The interior surface 1010 includes plural bearing pads 1012 that are replaceably received within the bearing housing 1002. In one example, four bearing pads 1012 are spaced equidistance from one another and are spaced within the interior surface 1010 of the bearing housing 1002. Alternatively, a single bearing pad 1012 is disposed around the entire interior surface 1010 of the bearing housing 1002. Each bearing pad 1012 includes plural openings 1014 disposed therethrough that are spaced across the surface of each bearing pad 1012. The plural openings 1014 receive pressurized air from a pressurized air supply system 1016 disposed within the bearing housing 1002.

The pressurized air supply system 1016 includes a pressurization inlet 1018 that in one example is a hydrostatic air pressurization inlet. The pressurization inlet receives pressurized air and is fluidly connected to a pressurization channel 1019 that supplies the pressurized air to the plural opening 1014 in the bearing pad 1012 as an outlet for the pressurized air supply system 1016. In one example, each bearing pad 1012 has a separate pressurized air supply system 1016 for supplying pressurized air to the interior surface 1010 of the bearing housing at the plural openings 1014. Alternatively, only one pressurized air supply system 1016 is provided, and the pressurized air is conveyed through channels within the bearing housing 1002 to plural openings 1014 in each bearing pad 1012.

A dampening system 1020 is also provided within the bearing housing 1002. In one example, disposed on either side of the pressurization inlet 1018 is an exterior damping pocket 1022 that may be filled with dampening fluid, and an interior damping pocket 1024 that may also be filled with dampening fluid and aligned with and spaced from the exterior damping pocket. In particular, a damping clearance pocket 1026 that is filled with air, spaces the interior damping pocket 1024 and exterior damping pocket 1022 to permit radial movement of the dampening system 1020 in response to a radial force. Specifically, each of the damping pockets 1022 and 1024 are lined with pad springs 1030 that permit movement in response to radial force to dampen this force. Thus, if the drive shaft 1006 engages the interior surface 1010, or causes radial force to be transferred to the interior surface 1010, the pad springs 1030, damping pockets 1022, 1024, damping fluid in the damping pockets 1022, 1024, and clearance pocket 1026 absorb the force to prevent structural damage of the bearing system 1000.

Figure 11:
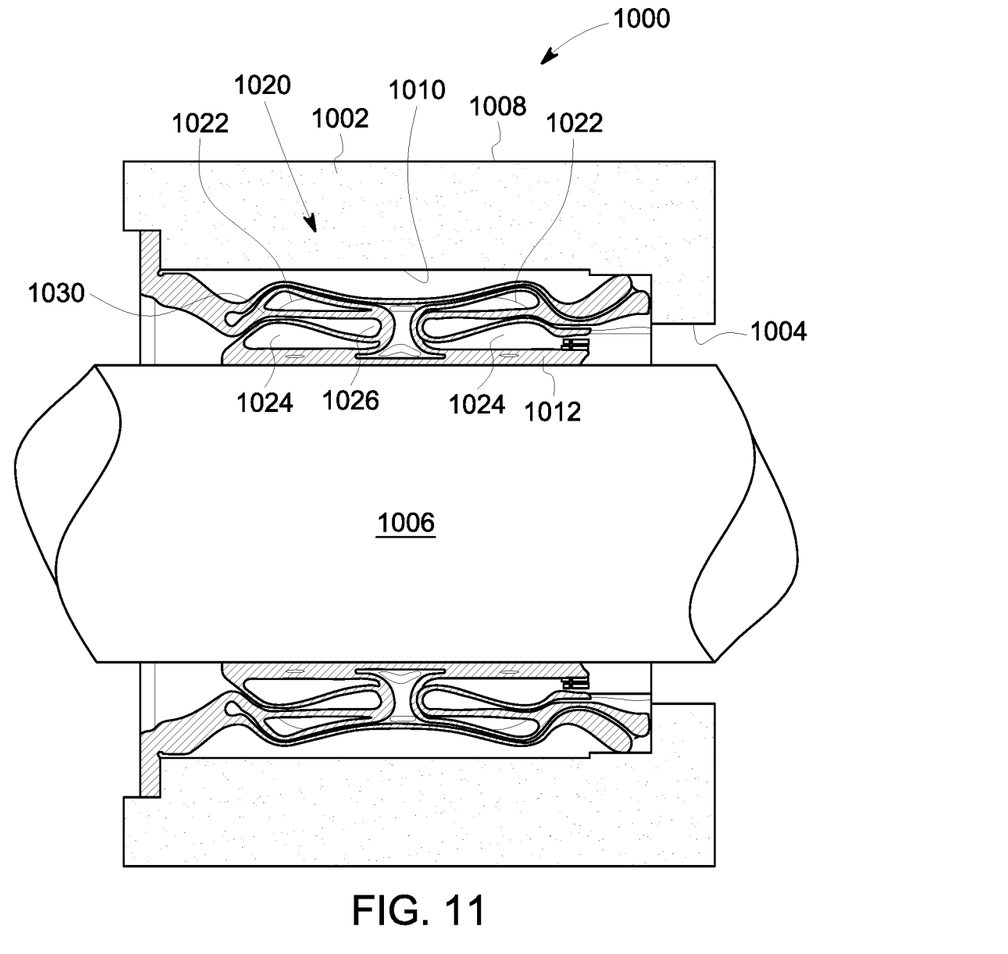
FIG. 11 is a partial front perspective view of a bearing system for an electric machine according to an embodiment.
Figure 12:
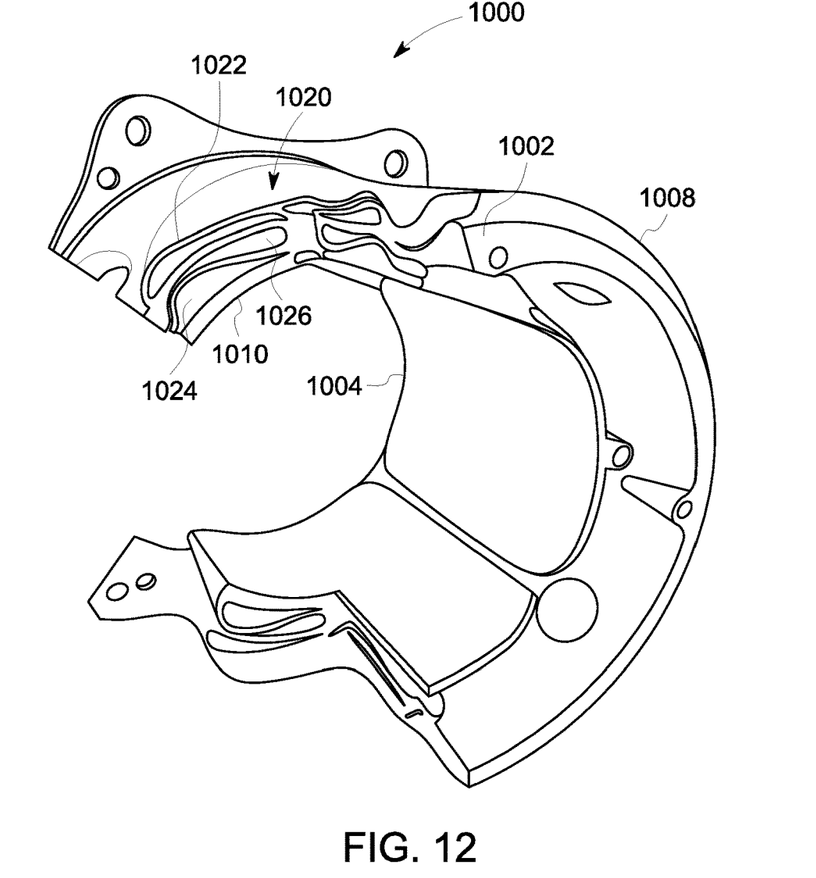
FIG. 12 is a schematic diagram of a bearing system for an electric machine according to an embodiment.

FIG. 11 illustrates a sectional view of the bearing system 1000 with the drive shaft 1006 disposed therethrough, while FIG. 12 illustrates a cut-away view of an example bearing system 1000 without the drive shaft 1006. As illustrated in both example embodiments, the damping system 1020 includes arcuately shaped damping pockets 1022, 1024, and clearance pocket 1026 to allow movement and absorption of force in all three dimensions.

The bearing system 1000 possesses individual bearing pads 1012 that interface with the bearing housing 1002 through flexible three-dimensional diaphragms formed from the damping pockets 1022, 1024 and clearance pocket 1026 having compliance in three (3) degrees of pad movement. The bearing system 1000 also implements external pressurization that in one example is obtained from compressor bleed air. External pressurization allows for superior load capacity and overall bearing performance when compared to foil bearings. External pressurization also eliminates the need for oil lubrication and accompanying systems that may be ineffective and cumbersome for a hypersonic aviation system. This is especially the case when at high altitudes where the ambient air density is low.

Figure 13:
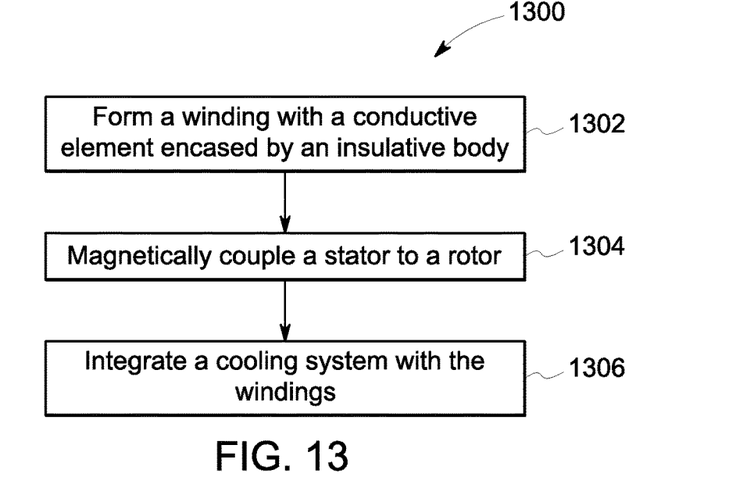
FIG. 13 is a flow block diagram of a method of forming an electric machine for an powered system according to an embodiment.

FIG. 13 illustrates a method 1300 of forming an electric machine for an aviation system. The electric machine may be the electric power system 102 described in FIG. 1, a generator 702 as described in relation to FIG. 7, or the like. The method may be performed in the order described, or in a different order depending on manufacturing constraints.

At 1302, a winding is formed with a conductive element encased by an insulative body. The conductive element may be one or more of copper, silver, nickel, nickel plated copper, silver plated copper etc., while the insulative body may be a ceramic-based material that includes one or more of alumina, zirconia, zirconium dioxide, magnesium oxide, macor composite, mullite, mica glass, etc. In one example, the conductive element is encased by the insulative body by utilizing a 3-D printing device that prints the insulative body and conductive element. Alternatively, the conductive material can be deposited onto the insulation body 502 chemically, such as by plating. By using additive techniques, complex geometries may be formed, including complex geometries associated with end windings that may not be formed using subtraction based manufacturing techniques. As a result, the insulative body may include a first cavity separated from a second cavity with a dividing wall, and the first cavity may include the conductive element.

At 1304, a stator is magnetically coupled to a rotor by disposing the winding around a pole of the stator, and providing current to the winding to induce current in the rotor. The winding is provided such that the difference in CTE between the insulation body material and the conductive element does not lead to ceramic fracture upon temperature cycling.

At 1306, a cooling system is integrated with the windings. In one example, liquid cooling and/or two-phase closed loop cooling using a loop heat pipe or thermosiphon is provided. Specifically, cavities or channels may be formed between windings between stator poles such that the cavities or channels do not interfere with the operation of the rotor, but are able to present fluid that conducts heat from within the system. The fluid may be a metallic fluid. In examples, the fluid may be a supercritical fluid such as a supercritical carbon dioxide ($sCO_2$). Heat may then be conducted by the fluid for other uses in the system. By integrating a cooling system with the windings during manufacturing, and using fluid to convey heat away from the windings, the system may operate above 600° C.

Provided is an electric power system for use with an aviation system that operates at hypersonic speeds, where the environmental and operational conditions are at and above 600° C. at an altitude of 100,000 feet, while supporting a heat/power loss output of 100 kW at 20 krpm. The electric power system includes integrated insulation, conductor, and cooling channels with functioning windings that support a switched reluctance motor arrangement. These windings are tooth windings comprised of multiple turns of multiple layers within each coil. Cooling is integrated within the windings, including liquid cooling and/or two-phase closed loop cooling using a loop heat pipe or thermosiphon. The cooling liquid moves heat away from the electric power system, and to a cooling system that may dispel the heat into the environment, or use the heat for another system of the aviation system. The two-phase closed loop cooling system operates passively, thus improving reliability. The electric power system also balances magnetic and structural performance by balancing magnetic performance, rotor dynamics, and structure so that the machine operates reliably. Thus, all of the stated problems have been overcome and objectives achieved.

In one or more embodiments a powered system is provided that may include an electric power system. The electric power system may include a stator having plural poles with each pole having a conductive winding that surrounds the corresponding pole and configured to generate a magnetic field, and a rotor configured to rotate in response to the magnetic field generated by the stator. At least one of the conductive windings is insulated with an insulation material configured to conduct heat from the at least one conductive winding while operating at a temperature above 600° C.

Optionally, the at least one of the conductive winding may include an insulation body formed of the insulation material and including a cavity that receives the conductive element. In one example, the insulation material may be a ceramic-based material that includes at least one of alumina, zirconia, zirconium dioxide, magnesium oxide, macor composite, mullite, or mica glass. Optionally, the rotor does not include a permanent magnet.

Optionally, the cavity is a first cavity, and the insulation body also includes a second cavity configured to provide a fluid flow path for a fluid that conducts at least some heat from the at least one conductive winding. In one aspect, the powered system may also include a cooling system fluidly coupled to the insulation body, and configured to convey a fluid to at least one of a heat exchanger or a heat sink. In one example, the heat exchanger may be configured to convey heat from the fluid to fuel within a fuel system. In one aspect, the fluid is one of supercritical carbon dioxide, a liquid alkali metal, or a metal halide. Optionally, the at least one of the conductive windings may be at least one of copper, silver, nickel, nickel plated copper, or silver plated copper.

Optionally, the powered system may also include a magnetic circuit electrically coupled to windings of first and second opposed poles of the plural poles of the stator, and include a first switch connected to a second switch in parallel. In another aspect, the powered system may also include a drive shaft disposed through and coupled to the rotor to rotate with the drive shaft, and a bearing system coupled to the drive shaft. The bearing system may include a bearing housing receiving at least one bearing pad on an interior surface of the bearing housing, the bearing pad including at least one opening. The bearing system may also include a pressured air supply system within the bearing housing and configured to provide pressurized air through the at least one opening in the bearing pad.

Optionally, the bearing system may also include a dampening system having an exterior damping pocket disposed within the bearing housing, an interior damping pocket disposed within the bearing housing, and a clearance pocket disposed between the interior damping pocket and exterior dampening pocket wherein the damping system is configured to dampen radial force caused by the drive shaft.

Optionally, the insulation material is positioned between a first pole and a second pole of the plural poles of the stator. In one aspect, the plural poles include six poles spaced equidistance apart and the rotor has four poles spaced equidistance apart. In another aspect, the powered system also includes a drive shaft disposed through and coupled to the rotor, wherein rotation of the rotor rotates the drive shaft.

In one or more embodiments, a powered system may be provided that may include an electric power system. The electric power system may include a stator having plural poles with each pole having a conductive winding that surrounds the corresponding pole and configured to generate a magnetic field, the conductive winding encased within a first cavity of an insulation body. The electric power system may also include a rotor configured to rotate in response to the magnetic field generated by the stator. The insulation body may be fluidly connected to a cooling system to receive liquid metal from the cooling system and to convey the liquid metal to the cooling system after the liquid metal conducts at least some heat from at least one of the conductive windings.

Optionally, the insulation body may include an insulation material that may be a ceramic-based material that includes at least one of alumina, zirconia, zirconium dioxide, magnesium oxide, macor composite, mullite, or mica glass. In another example, the at least one of the conductive windings may be at least one of copper, silver, nickel, nickel plated copper, or silver plated copper. In another aspect, the rotor may not include a permanent magnet.

In one or more embodiments a method of forming an electric machine for a powered system may be provided that may include forming a conductive winding encased by an insulative body with a three-dimensional printing device, and magnetically coupling a stator and a rotor by wrapping the conductive winding around a pole of the stator and providing current to the conductive winding to induce current in the rotor.

Optionally, the conductive winding may include an end winding within the insulative body. In one example, the insulative body includes a first cavity separated from a second cavity with a dividing wall. In another aspect, the first cavity may include the conductive winding, and the second cavity is configured to receive a fluid.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A powered system, comprising:
an insulation body defining a first cavity and a second cavity, wherein the insulation body is formed of insulation material;
a conductive winding encased in the first cavity of the insulation body;

a stator having a plurality of poles, wherein the insulation body, with the conductive winding encased in the first cavity thereof, is wrapped around one of the plurality of poles;
a rotor configured to rotate in response to a magnetic field generated by the conductive winding of the stator;
wherein the second cavity is configured to define a fluid flow path for a fluid that conducts heat from the conductive winding.

2. The powered system of claim 1, wherein the insulation material is a ceramic-based material that includes at least one of alumina, zirconia, zirconium dioxide, magnesium oxide, macor composite, mullite, or mica glass.

3. The powered system of claim 1, wherein the rotor does not include a permanent magnet.

4. The powered system of claim 1, wherein the first cavity and the second cavity are separated from one another by a dividing wall.

5. The powered system of claim 1, further comprising a cooling system fluidly coupled to the second cavity of the insulation body, and configured to convey a fluid to at least one of a heat exchanger or a heat sink.

6. The powered system of claim 1, wherein a heat exchanger is configured to receive a fluid that receives heat from the conductive winding, and to convey the heat to fuel within a fuel system.

7. The powered system of claim 6, wherein the fluid is one of supercritical carbon dioxide, a liquid alkali metal, or a metal halide.

8. The powered system of claim 1, wherein the at least one of the conductive windings is at least one of copper, silver, nickel, nickel plated copper, or silver plated copper.

9. The powered system of claim 1, further comprising:
a magnetic circuit electrically coupled to a first winding and a second winding, wherein the first winding is disposed around a first pole of the plurality of poles and the second winding is disposed around a second pole of the plurality of poles, wherein the first pole and second pole are opposed poles of the plurality of poles of the stator, and
a first switch connected to a second switch in parallel.

10. The powered system of claim 1, further comprising:
a drive shaft disposed through and coupled to the rotor to rotate with the drive shaft; and
a bearing system coupled to the drive shaft, the bearing system comprising:
a bearing housing receiving at least one bearing pad on an interior surface of the bearing housing, the bearing pad including at least one opening; and
a pressured air supply system within the bearing housing and configured to provide pressurized air through the at least one opening in the bearing pad.

11. The powered system of claim 10, wherein the bearing system further comprises a dampening system including an exterior damping pocket disposed within the bearing housing, an interior damping pocket disposed within the bearing housing, and a clearance pocket disposed between the interior damping pocket and exterior dampening pocket wherein the damping system is configured to dampen radial force caused by the drive shaft.

12. A powered system comprising:
an electric power system comprising:
a stator having a plurality of poles with each pole having a conductive winding that surrounds the corresponding pole and is configured to generate a magnetic field, the conductive winding encased within a first cavity of an insulation body, the insulation body fluidly connected to a cooling system;
a rotor configured to rotate in response to the magnetic field generated by the stator;
a drive shaft disposed through and coupled to the rotor to rotate with the drive shaft; and
a bearing system coupled to the drive shaft, the bearing system comprising:
a bearing housing receiving at least one bearing pad on an interior surface of the bearing housing, the bearing pad including at least one opening;
a pressured air supply system within the bearing housing and configured to provide pressurized air through the at least one opening in the bearing pad; and
a dampening system including:
an exterior damping pocket disposed within the bearing housing;
an interior damping pocket disposed within the bearing housing; and
a clearance pocket disposed between the interior damping pocket and exterior dampening pocket wherein the damping system is configured to dampen radial force caused by the drive shaft.

13. The powered system of claim 12, wherein the insulation body comprises an insulation material that is a ceramic-based material that includes at least one of alumina, zirconia, zirconium dioxide, magnesium oxide, macor composite, mullite, or mica glass.

14. The powered system of claim 12, wherein the at least one of the conductive windings is at least one of copper, silver, nickel, nickel plated copper, or silver plated copper.

15. The powered system of claim 12, wherein the rotor does not include a permanent magnet.

16. A method of forming an electric machine for a powered system comprising:
forming a conductive winding encased by an insulative body with a three-dimensional printing device, wherein the insulative body defines a first cavity and a second cavity, wherein the conductive winding is in the first cavity; and
magnetically coupling a stator and a rotor by wrapping the insulative body, with the conductive winding in the first cavity thereof, around a pole of the stator and providing current to the conductive winding to induce current in the rotor.

17. The method of claim 16, wherein the conductive winding includes an end winding within the insulative body.

18. The method of claim 16, wherein the insulative body includes a dividing wall separating the first cavity from the second cavity.

19. The method of claim 16, wherein the second cavity is configured to receive a fluid.

* * * * *